United States Patent Office 2,982,605
Patented May 2, 1961

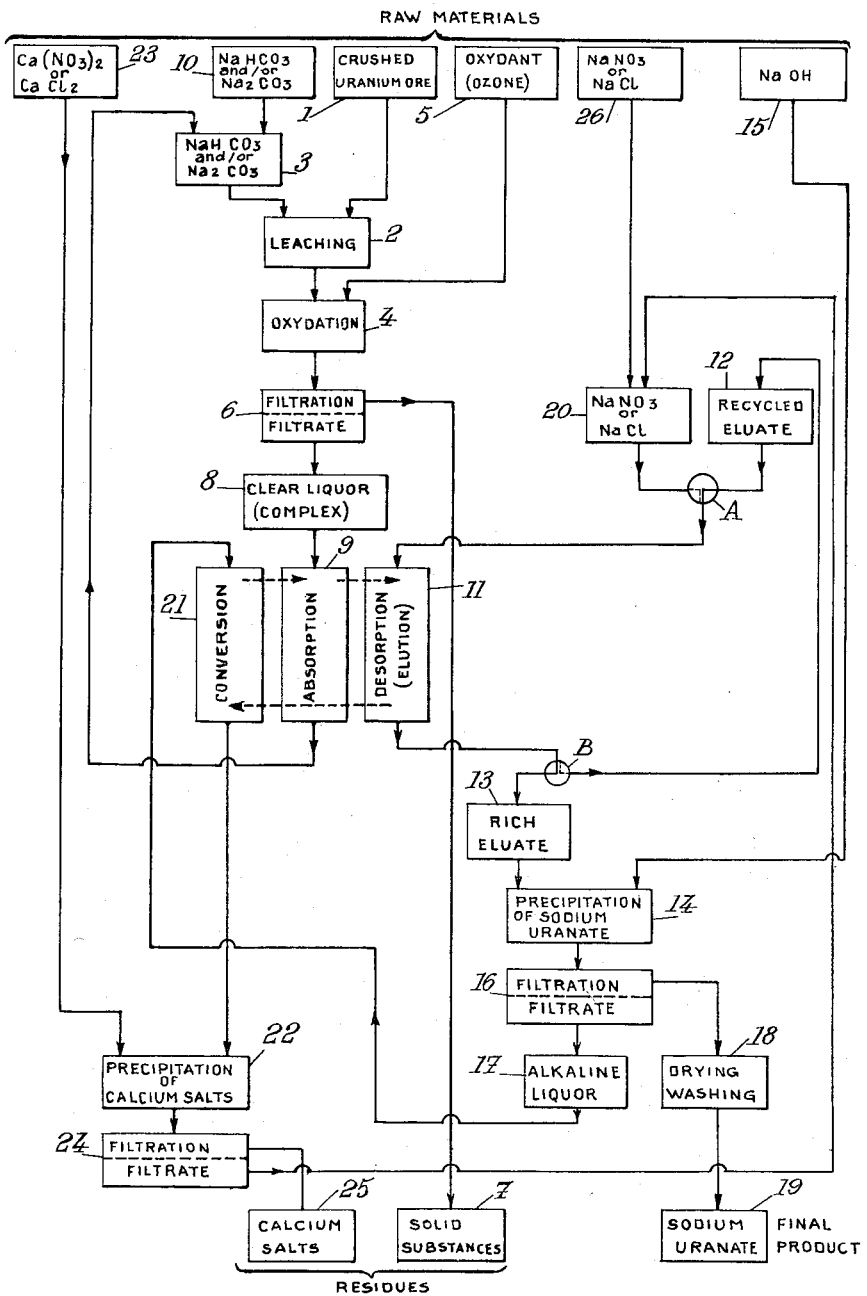

2,982,605
METHOD FOR THE ALKALINE TREATMENT OF URANIUM ORES BY MEANS OF ION EXCHANGE RESINS

Pierre Mouret, Bourg-la-Reine, Bernard Parly, Paray-Vieille-Poste, and Paul Pottier, Chatillon-sous-Bagneux, France, assignors to Commissariat à l'Energie Atomique, Paris, France Filed Mar. 4, 1959, Ser. No. 797,101
Claims priority, application France Mar. 6, 1958
6 Claims. (Cl. 23—14.5)

The present invention relates to uranium extraction methods comprising an alkaline leaching of the ore to be treated, after crushing thereof, a fixation on an ion exchange resin, and an elution, uranium being precipitated from the eluate by means of a base.

The object of the present invention is to provide improvements in such methods.

The known methods generally include the following three main operations:

(1) *Alkaline treatment to form a uranium containing solution.*—The ore, previously crushed so that chemical reagents can act on the uranium present therein, is treated by means of a mixture of sodium carbonate and sodium bicarbonate (possibly by only one of these two reagents). As a result of this leaching treatment, a solution of tetravalent uranyl-tricarbonic complex is formed by a reaction such as:

$$UO_3 + Na_2CO_3 + 2NaHCO_3 \rightarrow Na_4UO_2(CO_3)_3 + H_2O \quad (1)$$

The sodium uranyl-tricarbonate solution is generally separated by filtration or by decantation of solid materials.

(2) *Concentration and purification of the uranium containing solution.*—This double operation, which is effected by means of an ion exchange resin, includes two steps:

(a) Fixation on the resin: The solution which contains the complex is passed over an anion exchange resin of the "strong base" type by which the uranium complex is adsorbed by anion exchange according to a reaction of the following type:

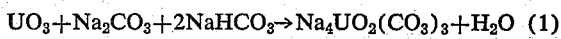

$$4R-Cl + UO_2(CO_3)_3 \rightleftharpoons R_4[UO_2(CO_3)_3] + 4Cl^- \quad (2)$$

This reaction taking place in the direction of the upper arrow, that is to say by an exchange of chlorine anions with uranyl-tricarbonate anions (in the case, of course, of the anion exchange resin R being in the chlorine form);

(b) Elution or desorption of the resin: The elution of the resin, which may be considered as constituting an intermediate ore, is generally obtained by means of a solution of sodium chloride or sodium nitrate, which displaces the equilibrium in the direction of the lower arrow in Formula 2; there is thus obtained a solution rich in uranium and free from most of the impurities which were mixed therewith as a consequence of the leaching operation.

(3) *Precipitation of uranium by treatment of the eluate by means of a base.*—Generally the eluate is treated with a sodium solution, which "decomplexes" the sodium uranyl-tricarbonate and precipitates sodium uranate which is separated, for instance by filtration, from a residual alkaline liquor. Sodium uranate, constituted by a mixture of uranium oxide and alkali or alkaline earth metal oxides together with some impurities, contains approximately from 60 to 75% of uranium (considered in the metallic form); it is intended to be used for manufacturing uranium in the metal form or uranium compounds (salts, oxides) used for instance in nuclear reactors. As for the residual alkaline liquor, it is at the present time either used for a new attack of the crushed uranium ores, or merely considered as a waste.

The improvements according to the present invention are concerned with the treatment and recycling of said residual alkaline liquor, with a view to obtaining a more economical treatment of uranium containing ores.

The main feature of the present invention consists in making use of the above-mentioned residual alkaline liquor to treat the eluted resin from which the concentrated and purified uranium complex has been separated, the eluate resulting from this treatment of the resin by said residual alkaline liquor being treated by a calcic solution as as to separate from this eluate, on the one hand insoluble calcium salts and on the other hand a salt solution which is recycled to be used as eluting solution for the treatment of the resin after it has adsorbed the uranium complex.

Advantageously, in the method according to the present invention, the solution of uranyl-tricarbonic complex, which is to be adsorbed by the ion exchange resin and which is generally called "clear liquor," should be as free as possible from impurities such as reducing sulfides, the colloidal particles of metallic compounds brought into solution during the attack of the ore by carbonates and the humic acids resulting from leaching of the superficial earth layers by rain water.

This is why, according to the present invention, these impurities are eliminated by an oxidation (for instance by means of ozone) which transforms the sulfides into sulfates before the filtration or decantation operation intended to separate the solid materials from the clear liquor which is subsequently brought into contact with the ion exchange resin.

We will now describe the invention with reference to the appended drawing which gives a flow sheet of the operation.

(1) *Alkaline treatment to form a uranium containing solution.*—The uranium ore, after crushing and storing at 1, is first subjected to a leaching operation in a tank 2, by means of a solution of sodium carbonate and/or sodium bicarbonate from tank 3. This leaching operation solubilizes from 80 to 97% of the uranium of the ore.

The products of this leaching operation, including a solution of the uranyl-tricarbonic complex, are subjected to an oxidation at 4, for instance by means of ozone fed from 5, so as to eliminate the most undesirable impurities from the solution of the complex.

The oxidized products are filtered on a filter 6 which separates the waste (eliminated at 7) from the filtrate constituted by the clear liquor 8, in which the uranyl-tricarbonic complex is contained. This clear liquor generally contains from 10 to 500 mg. of uranium and from 10 to 50 g. of alkaline carbonate per liter, its pH generally ranging from 9.5 to 10.5 (which shows that it is partly bicarbonated).

(2) *Concentration and purification of the uranium containing solution.*—The clear liquor is passed on an anion exchange resin of the strong base type the active radical of which is quaternary ammonium, contained in a column 9. Uranium is adsorbed on this resin in the form of a uranyl-tricarbonic complex according to Reaction 2, the capacity of adsorption of the resin varying somewhat with the anion form thereof and decreasing when passing from the anion $OH^-$ successively to anions $CO_3^{--}$, $Cl^-$, $NO_3^-$. Furthermore, the fixation of uranium on this resin is influenced by the pH (therefore the concentration of bicarbonate), the concentration of sodium carbonate and chiefly the concentration of sulfates.

In order to obtain a good adsorption, the limits of these various factors should be as follows:

pH ranging from 9.5 to 11.5, preferably equal to 10.5,
Concentration of $Na_2CO_3$ lower than 30 g./l.,
Concentration of $NaHCO_3$ lower than 15 g./l.,
Concentration of $SO_4^{--}$ ion lower than 6 g./l.

The resin of column 9 is charged with uranium, thus constituting an intermediate ore which contains, when it is saturated in uranium, from 30 to 50 g. of uranium per liter (this amount being indicated in elementary uranium).

The effluent from column 9, where uranium is adsorbed, is sent to tank 3 since it is essentially constituted by a solution of sodium carbonate and/or bicarbonate from which uranium has been extracted.

Of course, the concentration of the attacking carbonate solution is adjusted in tank 3 by means of a fresh solution of sodium carbonate and/or bicarbonate, supplied from 10.

When the resin has adsorbed a sufficient amount of uranium, ranging for instance from 30 to 50 g. per liter, the resin is eluted by means of a suitable eluting salt solution, which may be for instance a solution of sodium chloride or sodium nitrate having a pH equal to 7 and containing 1.0 gram-molecule per liter.

In order to clarify the flow sheet, it has been supposed that the resin is distributed among several columns, column 11 being intended for desorption by solutions of sodium nitrate or chloride.

In order to reduce the consumption of sodium nitrate or chloride, the first step of the elution operation is effected by means of the eluate of a preceding operation, recycled and stored up in tank 12. For this purpose, a valve A the distributing member of which is in the position shown in solid lines first places this tank 12 in communication with column 11 and the eluate of this first operation, which is rich in uranium (from 8 to 16 g. of uranium per liter), is sent past a valve B (the distributing member of which is in the position shown in solid lines) at 13 to be treated as it will be hereinafter explained.

In a second step of the elution or desorption operation, the valves A and B are shifted so that their distributing members are in the positions shown in dotted lines. Thus, the sodium nitrate or chloride of tank 20 is sent on the resin of column 11, which has already been freed from most of the complex during the first step of the elution operation, the weak eluate which flows out from column 11 being recycled to tank 12 to be used for the first phase of desorption during a subsequent operation.

During these two steps, we generally pass on the resin having adsorbed the uranium complex a volume of eluant equal to 5-7 times the volume of resin.

The resin is thus regenerated in its active salt form (nitrate or chloride form according to the nature of the eluant). Finally, the resin which is to fix uranium (the other impurities being in cathionic form and being not adsorbed by an anion exchange resin) has served to concentrate and purify the uranium containing solution which initially contained from 10 to 500 mg. per liter and now contains from 8 to 16 g. per liter.

(3) *Precipitation of uranium.*—The rich eluate 13, which contains about 90% of the amount of uranium of column 11 of the ion exchange resin, is treated by a soda solution, supplied from 15 and containing from 5 to 15 g. of sodium hydroxide per liter. This causes a precipitation, at 14, of sodium uranate. This substance is filtered on a filter 16, the alkaline liquor, which constitutes the filtrate and arrives at 17, being treated, according to the invention, as it will be hereinafter explained. As for the sodium uranate precipitate, it is dried and washed at 18, and we obtain at 19 the final product of the operation, constituted by sodium uranate which is then treated through any suitable method to obtain either metallic uranium, or an oxide or a salt of uranium.

Up to now and excepting the oxidizing operation effected at 4 and the particular way in which the eluate is recycled, the method which has been described is of the conventional type.

(4) *Recycling and treatment of the residual alkaline liquor.*—According to the invention, this alkaline liquor is fed to the resin which has undergone desorption by sodium nitrate or chloride, the resin thus desorbed or eluted being located in the conversion column 21. On the drawing we have shown, by dotted line arrows, the direction of circulation of the anion exchange resin which subsequently undergoes the phases of adsorption at 9, desorption at 11, conversion at 21, and so on, the means used to obtain this permutation being well known in the art. We may for instance:

Either provide a set of valves so that the outlets from 8, A and 17 are successively sent to each of these columns, the outlet of the column being connected, through another set of valves, toward 3, B and 22 respectively, so that each of the columns successively plays the part of elements 9, 11, 21 and so on, Or provide means for passing the resin from one column to the next one according to the arrows shown in dotted lines.

Furthermore, each of the columns 9, 11 and 21, and in particular column 9, may include several units disposed in series and through which the liquid and in particular the clear liquor passes successively.

The alkaline liquor 17 displaces the anions $NO_3^-$ or $Cl^-$ from the resin contained in column 21 and replaces them by the anions $OH^-$ of the soda in excess that is contained by this liquor. Now, as above indicated, the $OH^-$ form of the resin is that which is better adapted for retaining the uranium ions. Consequently, the method according to the invention serves not only to ensure an economy of the chemical reagents brought into play, but also permits a better use of the anion exchange resin.

The salt solution flowing out from column 21 is treated at 22 by a calcic solution, for instance of calcium chloride or calcium nitrate, fed from 23, which has for its effect to precipitate in the form of insoluble calcium salts some of the soluble salts contained in the eluate of column 21. Among these salts are the traces of humic acid salts which have resisted the oxidizing treatment at 4.

The precipitate formed by the calcium salts is washed, then filtered on a filter 24, the insoluble portion being sent at 25 to be for instance considered as a waste, whereas the filtrate is recycled into tank 20, since it is essentially constituted by sodium nitrate or chloride (according to which calcium salt is stored up at 23). Of course, in the tank 20, the concentration of the sodium salt is to be readjusted by means of a fresh solution of this salt supplied from tank 26 so as finally to obtain a sodium salt having a concentration such that it can be used for the elution of the resin in column 11.

The flow sheet shown by the drawing can be used for various particular treatments.

*Example 1*

430 liters of a clear uranium containing solution 8, containing 120 mg. of uranium (in the elementary form), 25 g. of sodium carbonate and 0.3 g. of $SO_4^{--}$ ions per liter (pH 10.5) are passed through column 9 which contains 1 kg. of a resin designated by "Amberlite I.R.A. 410," manufactured by the American firm Rohm & Haas (this resin being distributed in several columns as shown), which corresponds to 51.6 g. of uranium per kg. of resin in column 9. The effluent solution which essentially contains sodium carbonate is recycled for the leaching of the ore at 3.

The uranium that has been adsorbed by the kilogram of resin is desorbed in column 11 by elution with 6 liters of a solution of sodium nitrate containing one gram-molecule of NaNO₃ per liter. The three first liters of eluate, which contain 16 g. of uranium metal, 55 g. of sodium nitrate and 0.9 g. of $SO_4{}^{--}$ per liter (rich eluate 13), are treated at 14 by a solution of soda containing 10 g. of sodium hydroxide per liter. The sodium uranate that is precipitated is filtered on filter 16, washed and dried, which gives a uranate containing 48 g. of uranium.

The three last liters of eluate which contain from 0.8 to 0.9 g. of uranium per liter are recycled at 12.

As for the alkaline liquor 17, which constitutes the filtrate of the filtration operation effected on filter 16 and which contains 55 g. of sodium nitrate, 5.2 g. of sodium hydroxide, 0.8 g. of sodium sulfate and traces of sodium carbonate, it is fed back to the resin contained in column 21, that is to say having undergone desorption at 11.

At the bottom of colum 21, we collect a solution containing substantially one gram-molecule of sodium nitrate per liter, with a small amount of sodium sulfate, traces of sodium carbonate and possibly traces of humic acids.

This solution is treated at 22 by means of a solution of calcium nitrate, in order to precipitate the insoluble traces of calcium salts (sulfates, traces of carbonates) which are filtered at 24, the solution of sodium nitrate that constitutes the filtrate being recycled at 20 to be used as fresh eluant.

*Example 2*

The treatment of the clear uranium containing solution of Example 1 is repeated by using, as ion exchange resin, the "De-Acidite FF" resin, manufactured by the United Water Softener Co., and by making use of sodium chloride to perform the desorption of the resin in column 11 and of calcium chloride to precipitate the calcium salts at 22.

*Examples 3 to 7*

The treatment of the uranium containing solution according to the method of Example 1 is repeated but with the following resins: "Amberlite I.R.A. 400" (manufactured by Rohm & Haas), Allassion AX-55 and Allassion AX-17 (manufactured by Prosimacfi) and Dowex 1 and Dowex 2 (manufactured by the Dow Chemical Company). The results are substantially equivalent.

Concerning the operation of oxidation at 4, it is advantageously effected by means of ozone, because this reagent is easy to use and does not leave any residue, but we might of course, without departing from the scope of this invention, make use of other oxidation methods, for instance by means of manganese dioxide.

In a general manner, while we have, in the above description, disclosed what we deem to be practical and efficient embodiments of our invention, it should be well understood that we do not wish to be limited thereto as there might be changes made therein, without departing from the principle of the present invention as comprehended within the scope of the accompanying claims.

What we claim is:

1. In a method of treating uranium ores which comprises the steps of attacking the ore by a first alkaline solution in order to obtain a uranium solution, placing this uranium solution in contact with an anion exchange resin of the strong base type which fixes uranium, washing this resin with an elution solution so as to extract uranium therefrom, and treating the eluate by a second alkaline solution in order to obtain, on the one hand a precipitate rich in uranium, and on the other hand a residual alkaline liquor, the feature which consists in recycling said residual alkaline liquor onto said resin after it has been eluted to extract uranium therefrom, treating the eluate resulting from the action of this residual alkaline liquor by a calcic solution so as to separate therefrom, on the one hand the insoluble calcium salts and, on the other hand, a salt solution, and recycling said salt solution as elution solution to extract uranium therefrom.

2. A method according to claim 1 in which the concentration of said salt solution is readjusted before this solution is recycled to produce elution of the resin.

3. A method according to claim 1 in which said calcic solution is a solution of calcium nitrate.

4. A method according to claim 1 in which said calcic solution is a solution of calcium chloride.

5. A method according to claim 1 in which the uranium solution is oxidized before being passed through the anion exchange resin.

6. A method according to claim 5 in which oxidation is effected by means of ozone.

References Cited in the file of this patent

Proceedings of the International Conference on the Peaceful Uses of Atomic Energy, Aug. 8-20, 1955, vol. 8, pages 49-53, United Nations, New York.